United States Patent [19]

Bergstrom

[11] Patent Number: 4,699,548

[45] Date of Patent: Oct. 13, 1987

[54] SLURRY CONVEYING SYSTEM

[75] Inventor: David A. Bergstrom, Blaine, Minn.

[73] Assignee: Howden Environmental Systems, Inc., Minneapolis, Minn.

[21] Appl. No.: 821,411

[22] Filed: Jan. 21, 1986

Related U.S. Application Data

[63] Continuation of Ser. No. 563,075, Dec. 19, 1983, abandoned.

[51] Int. Cl.[4] ............................................. B65G 53/40
[52] U.S. Cl. ...................................... 406/109; 406/15; 406/28; 406/50; 406/130; 406/137; 406/146
[58] Field of Search ............................... 406/10, 12–15, 406/28, 30, 50, 45, 109, 122, 127, 134, 136, 137, 146, 124, 144, 130; 222/148

[56] References Cited

U.S. PATENT DOCUMENTS

| | | | |
|---|---|---|---|
| 1,232,510 | 7/1917 | Derrick et al. | 406/136 X |
| 3,360,301 | 12/1967 | Donaho, Jr. | 406/136 |
| 3,372,958 | 3/1968 | Black | 406/30 X |
| 3,437,384 | 4/1969 | Bozich | 406/30 X |
| 3,606,036 | 9/1971 | Beebe et al. | 406/137 X |
| 3,729,232 | 4/1973 | Sakata et al. | 406/137 X |
| 3,858,943 | 1/1975 | Bose et al. | 406/137 X |

FOREIGN PATENT DOCUMENTS

| | | | |
|---|---|---|---|
| 31215 | 3/1978 | Japan | 406/136 |
| 131261 | 10/1979 | Japan | 406/137 |
| 69618 | 4/1983 | Japan | 406/136 |

*Primary Examiner*—Andres Kashnikow
*Assistant Examiner*—Mary Beth O. Jones

[57] ABSTRACT

A slurry conveying system including a pressurizable tank into which particulate material is charged. A discharge opening enters the tank bottom and fluidizing water is directed upwardly through the discharge opening into the tank. The discharge opening is centered in a landing which has a diameter greater than 1.5 times and no greater than five times the diameter of the discharge opening. Arching of particles at the opening is prevented due to the landing and fluidizing water. The tank is emptied by the combination of air under pressure and a water rinse immediately after the fluidizing is accomplished.

5 Claims, 4 Drawing Figures

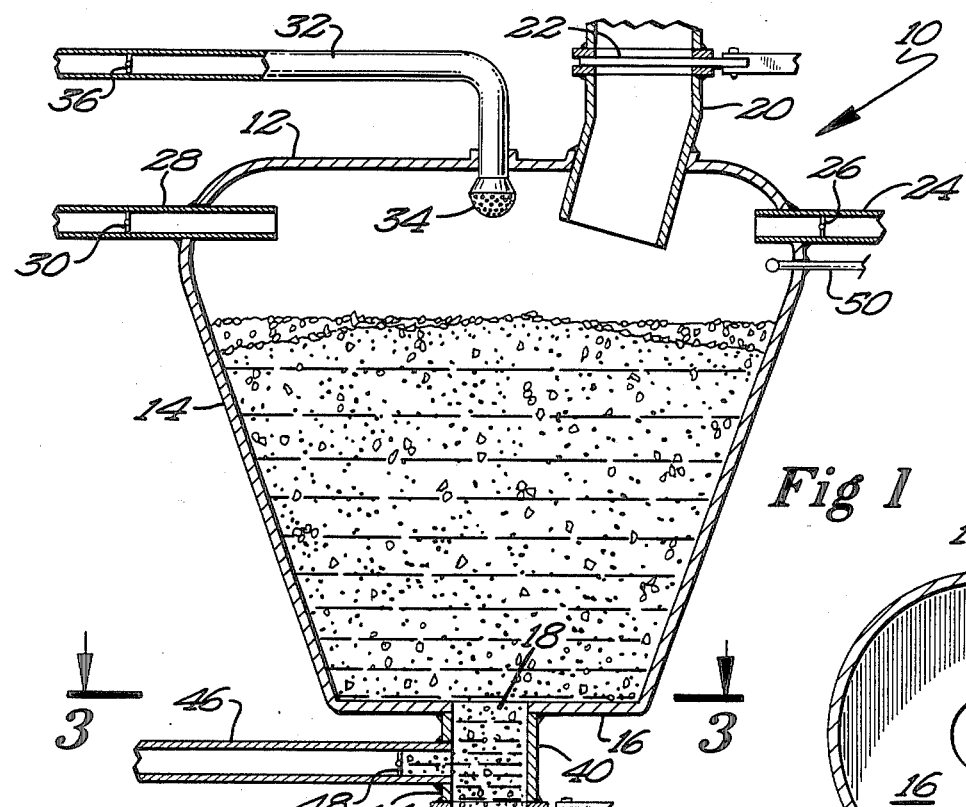
*Fig 1*
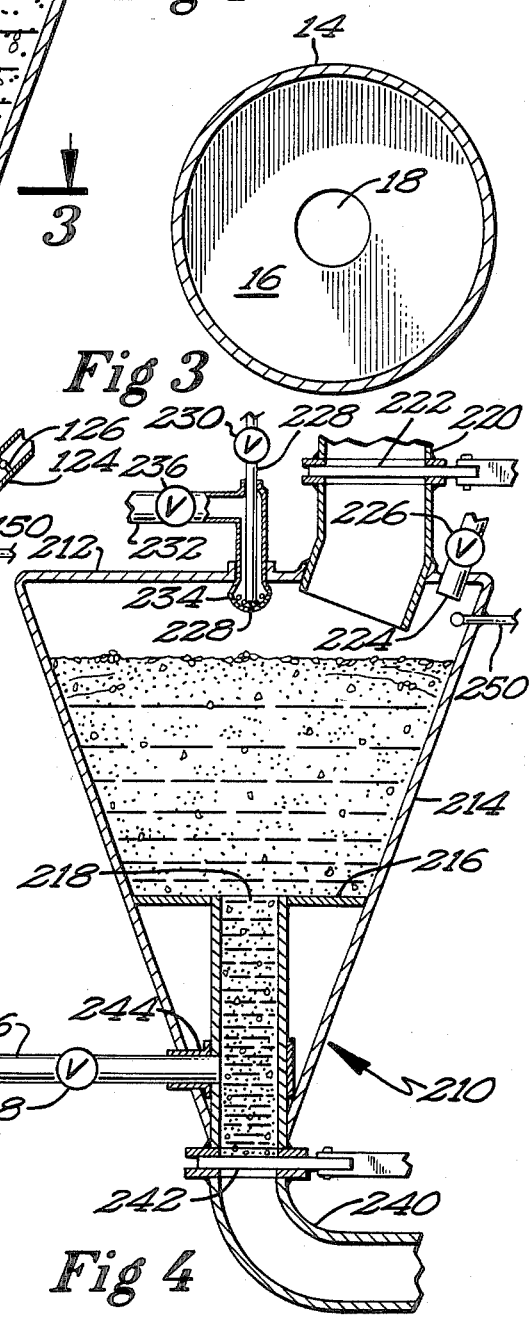
*Fig 3*
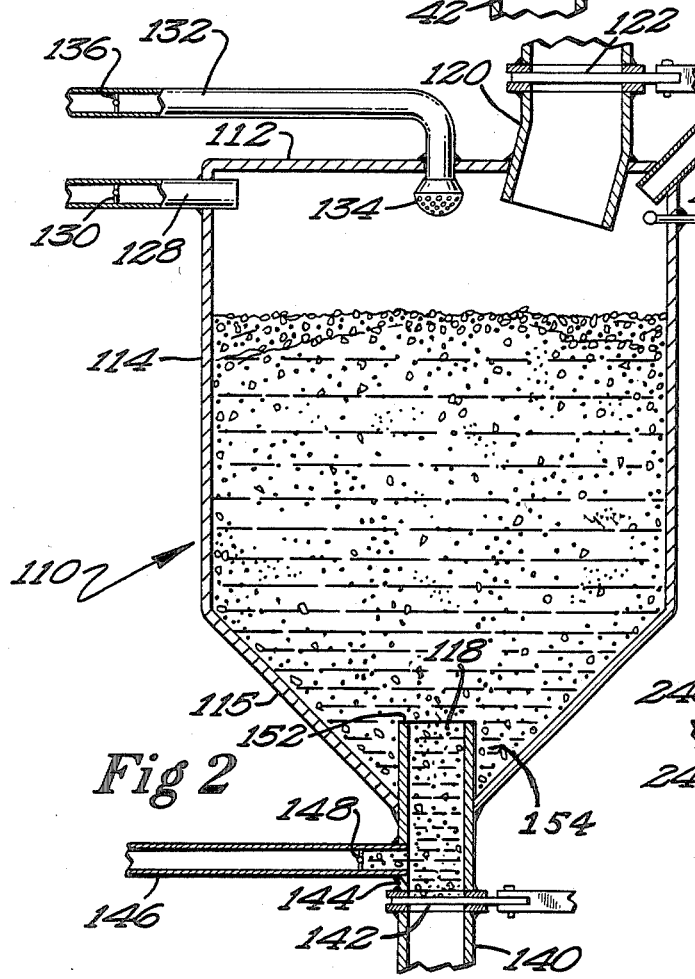
*Fig 2*
*Fig 4*

# SLURRY CONVEYING SYSTEM

This is a continuation of application Ser. No. 06/563,075, filed Dec. 19, 1983, now abandoned.

BACKGROUND OF THE INVENTION

1. Field of the Invention

This invention relates to systems for conveying particulate material and more particularly to the field of devices for fluidizing particulate materials and conveying same while in liquid suspension.

2. Description of the Prior Art

Slurry conveying systems have long been used for disposal of waste materials in industries. From the standpoint of flow, there are three types of bins: mass-flow, funnel-flow, and expanded-flow.

Mass-flow occurs when the hopper walls are sufficiently steep and smooth to cause flow of all the solid without stagnant regions. Valleys, ledges and protrusions are not permitted in the hopper. Mass-flow bins have a first-in, first-out flow sequence. Mass-flow type bins are recommended for cohesive materials. The critical flow rate must not be exceeded to prevent channeling, that is, the development of a fast flowing column of material within the bed of material.

Funnel-flow occurs when the hopper walls are not sufficiently steep and smooth to force material to slide along the walls or when the outlet of a mass-flow bin is not fully effective. Solid flows toward the outlet through a channel that forms within stagnant material. The diameter of the channel approximates the largest dimension of the effective outlet. As the level of solid within the channel drops, layers slough off the top of the stagnant mass and fall into the channel. This spasmodic behavior is detrimental with cohesive solids since the falling material packs on impact, thereby increasing the chance of material developing a stable arch across the hopper so that a complete stoppage of flow results. A channel may empty out completely, forming what is known as a rathole.

The funnel-flow bins are more prone to cause arching of cohesive solids than mass-flow bins and may therefore require larger outlets for dependable flow. Funnel-flow bins are suitable for coarse, free-flowing or slightly cohesive nondegrading solids.

Expanded flow bins are formed by attaching a mass-flow hopper to the bottom of a funnel-flow bin. The outlet usually requires a smaller feeder than would be the case for a funnel-flow bin. This design is useful as a modification for existing funnel-flow bins to correct erratic flow caused by arching, ratholing or flushing.

Generally, the outlet dimensions of a hopper outlet are sized to assure unobstructed flow. Flow may be obstructed by interlocking of large particles and cohesive doming and ratholing across or above the outlet. Prevention of interlocking normally requires that the outlet be larger than several particle sizes. Prevention of cohesive obstructions requires that the outlet be sufficiently large to ensure the failure of potentional cohesive obstructions.

When solids flow into a mass flow conical hopper, the solids are unconsolidated when deposited at the top, but, as an element of the solid flows down, it becomes consolidated under the pressure acting on it in the bin. In a mass-flow bin, a dome across the hopper is the potential obstruction.

Many solids are free flowing if they are kept in motion but cake severely if stored at rest for a period of time. Flowability tests predict the maximum time that a solid can remain in storage at rest.

Gas can be introduced purposely into a bin to promote flow. In U.S. Pat. No. 4,085,975 to Bilkvist issued Apr. 25, 1978, particulate material is aerated as it is transferred into a pressure vessel. Ambient air coming through a bottom perforated plenum pad mixes with incoming bulk particulate material to prevent compaction or compression in the loader. During emptying of the bin, the ambient air supply to the aeration pad is closed and a blower is used to force the particulate material out of the bin.

Coal transporting systems are currently used to transport materials which include fines, such a coal dust, and particulates as large as 3" in diameter. These materials are generally conveyed to settling ponds. In certain installations, the amount of air utilized must be controlled and, therefore, only a minimum amount of air should be utilized to effect conveyance. Large amounts of water must be avoided in conveying in order to avoid creating additional problems of disposing of the water.

Systems for conveying material having a wide range of particle size which include dusty materials preferably are referred to as wet-phase, meaning that water is utilized. One of the major problems involved is to prevent arching in the area where the material must flow from the charging vessel into the conveying line because a constriction exists at that point and large particles tend to arch there with subsequent plugging of the line.

Waste materials in power generation plants are normally handled using a jet pump. Jet pumps eductors are normally used for wet conveying systems. The motive power is provided by a high pressure stream of water. The resultant jet of high velocity fluid creates a low pressure area within, sucking solid material into the device and discharging it into the conveying line.

Eductors require large volumes of water at high pressures to work properly and efficiency is low. Particle size is limited to the size of the internal ports of the eductor. Head pressure is also low, restricting the use to shorter conveying lines having little or no lift. Because of the restrictions in eductors, an 8" line is needed to pass 3" particles. This increase in line size to accommodate course materials mandates large quantities of carrier liquid, thus contributing to the inefficient operation.

Prior art blow tanks systems utilize a pressure vessel having a cone-shaped bottom. The cone-shape is designed to funnel solids to a central discharge point with minimum hangup. Arching is a common problem when conveying particles which are larger than fines or when the material to be conveyed is a mixture of fines and large particles. High velocity blow tank systems are plagued with wear problems whenever conveying abrasive materials. Wear rate is proportional to the cube of the velocity. Conventional blow tanks are unreliable for wet coal because of presistent plugging.

It is therefore an object of the invention to provide a conveying system which will convey particulate using a minimum of water and air.

It is a further object of the invention to provide a system which minimizes the arching of coarse particles at the pressure vessel discharge port.

It is a still further object of the invention to prevent the retention of solids on vessel walls after discharge and to overcome the problems of insufficient fluidizing of the particulate in pressure vessels.

BRIEF SUMMARY OF THE INVENTION

The slurry conveying system of the invention includes a pressurizable tank or pressure vessel into which particulate is charged through an upper particulate inlet.

The tank is generally cone-shaped in configuration with the tank walls preferably being at about a 70° angle. The particulate outlet is centered in the bottom of the cone-shaped tank. It has been found that arching in cone-shaped tanks occurs due to the almost perpendicular contact particles have with the wall near the outlet. To eliminate the arching problem, a flat-bottom, cone-shaped tank is utilized. The forces of the arch which are normally transferred to the hopper walls are substantially reduced with this configuration. Forces are distributed over a larger diameter because the diameter over which the arch can form is enlarged. Also, the actual arch diameter is reduced to roughly the size of the discharge line.

This unique flat bottomed, cone-shaped tank can be achieved in a number of ways. The tank itself can be formed with a flat bottom through which the outlet depends. Alternatively, the outlet may enter the bottom of the cone-shaped tank, such that a pipe extends upwardly into the tank. Arching is lessened with such a configuration since the forces are again distributed over a large diameter. In normal use, the particles will fill the bottom of the cone around the projecting pipe outlet until the tank operates in a manner similar to the flat bottom cone of the invention.

Fluidizing water is added to the tank after particles have been charged within the tank. Water is injected upwardly at a relatively high velocity prior to discharge to precondition the solids. Preferably, fluidizing water enters the discharge outlet below the uppermost portion of the discharge outlet pipe such that the water flow vectors are substantially vertical.

Besides fluidizing the particles within the tank, the fluidizing water functions to break up any plugs formed at the discharge outlet due to arching. Since the arch formed is necessarily smaller due to the flat bottom cone-shaped tank, the reverse flow of the fluidizing water is more effective.

After the dry material within the tank is wetted and fluidized by the upward motion of water, pressure within the tank rises to about 8 lbs per square inch.

The upward flow of high velocity water lifts solids in the pressure vessel into suspension which reduces the concentration of coarser particles at the bottom of the vessel. This dispersing technique effectively preconditions the solids for discharge and also aids in reducing plugging. In conventional blow tanks, coarser particles tend to settle to the bottom first, with particles as large as 1" to 3" remaining in suspension for only a few seconds. Such coarse particles tend to concentrate at the bottom of the vessel, unless preconditioned as described.

Water and air are then introduced through the tank as a conveying medium, the upward flow of water through the discharge outlet being reversed, and conveying proceeds immediately thereafter. The use of water alone in a hydraulic system results in incomplete discharge when conveying fine dusty material such as coal dust. Such dust is in a highly agglomerated form and does not wet easily and tends to float on top of the water.

To assure complete discharge of all solids, air is injected at the top of the vessel along with the water. The air displaces both the water and solids, eliminating the flotation problems. To assure no hangup on the interior walls, water is also injected through a spray nozzle which is preferably located near the top of the pressure vessel. This water spray washes the pressure tank walls during discharge when the liquid level drops to a lower level, thereby exposing the walls to the spray. During conveying, the air and water act as a conveying medium which quickly empties the tank of the particulate. Plugging due to arching is decreased due to the tank construction, fluidizing arrangement, and prompt evacuation of its interior.

BRIEF DESCRIPTION OF THE DRAWINGS

The detailed description of the invention, including its preferred embodiments is hereinafter described with specific reference being made to the drawings in which:

FIG. 1 is a sectional side elevational view of the slurry conveyor of the invention;

FIG. 2 is a sectional side elevational view of an alternative embodiment of the invention with a discharge line extending upwardly within the tank; and, FIG. 3 is a cross-sectional view through line 3—3 of FIGS. 1; and FIG. 4 is a side elevational view of the preferred slurry system of the invention.

DETAILED DESCRIPTION OF THE INVENTION

Example 1

Referring to FIG. 1, the pressurizable tank 10 is shown in cross section and includes a top 12 and side walls 14 which generally define a frusto-conical hopper. The tank bottom includes a landing 16 through which a discharge opening 18 is centered.

Particulate material enters pressure tank 10 through conveying line 20 which penetrates the top of tank 10. Conveying line 20 includes a valve 22 to control the introduction of particulate into tank 10. Valve 22 may be of any type, although the preferred valve presents no obstruction when open. A suitable valve is a knife gate valve.

Tank 10 preferably includes a vent 24 situated along top 12 which is controlled by vent valve 26 so as to provide a connection between the interior of the tank and ambient air when desired.

Conveying air is supplied to tank 10 through air supply line 28 which preferably enters the tank above the particulate material and water introduced into the tank. Pressurized air is supplied through air supply line 28 which is regulated by valve 30. Air is supplied by any plant hook-up (not shown). The air pressure required depends on the tank size and the rate of slurry conveying desired. Generally, any system which can supply 80 lbs. per square inch of air would be adequate for most applications.

Spray water is supplied through rinse water line 32 which preferably enters the tank through top 12 such that spray water may be directed downward on top of particulate material within the tank. Preferably, the spray ball 34 is attached to rinse water line 32 such that water is directed towards the inner side walls 14 of tank 10. Since the primary motivating force is air and fluidizing water, rinse water line 32 is mainly relied on to wash the tank walls down and a 1" or ¾" diameter rinse water line 32 should provide all the water volume required. Rinse water line 32 includes valve 36 to control the introduction of rinse water into tank 10.

A discharge pipe 40 extends downwardly from discharge opening 18 and includes a valve 42 which preferably provides little or no obstruction to flow through discharge pipe 40 when the valve is open. A knife gate valve is a suitable valve.

Fluidization water enters discharge pipe 40 through a Tee-connection 44 which is connected to fluidization pipe 46. Fluidization pipe 46 is connected to a source of water (not shown) which may tap into normal city water pressure. Fluidization water pressure needed in the system is a function of the elevation of the tank, but is generally in a range of 15 to 20 lbs per square inch. Normal city water pressures of 50 lbs per square inch provides sufficient high velocity water.

It is preferred that Tee 44 enters discharge pipe 40 far enough below discharge 18 such that the fluidization water entering tank 10 travels in a substantially vertical vector. It has been found that placement of Tee 44 at a distance of approximately 3-4 times the opening diameter from discharge opening 18 is adequate.

Conveying line 20 is preferably sized several times larger than the largest expected particle size to enter pressure tank 10. Conveying line 20 should as a minimum, be sized, at least slightly larger than the largest expected particle to avoid line cloggage.

Discharge opening 18 must have an inside diameter larger than the maximum particle size expected to be loaded into tank 10. Preferably, a 4" diameter opening should be provided for particle sizes which may reach 3" in diameter. It has been found that the diameter of landing 16 should be at least 1 and ½ times the diameter of discharge opening 18. Such a landing size appreciably lessens arching. Preferably, the landing diameter is four times the diameter of the discharge opening 18. While arching is lessened when the landing size is increased in comparison with the discharge opening diameter, whenever the landing diameter is greater than about 5 times the discharge opening, space tends to be wasted in the tank and it is more difficult to completely empty the tank. Therefore, it is preferred that the ratio of landing diameter to discharge opening diameter be within the range to 5:1 to 1½:1. A ratio of about 4:1 is most preferred, as exemplified by a three inch diameter discharge opening and a twelve inch diameter landing.

During operation, particulate material is charged into tank 10 through conveying line 20. Conveying line valve 22 and vent valve 26 are the only valves open at this time. The conveying line and vent valves are then closed and the fluidization valve is opened which allows high velocity water to move up through discharge pipe 40 through discharge opening 18 and into tank 10. Solids in the tank are lifted into suspension which reduces the concentration of coarser particles at the bottom of the vessel. Any plugs due to arching across the discharge opening 18 are removed due to the introduction of fluidization water. The pressure within the tank rises to about 8 lbs per square inch, or more depending upon conveying line elevation, due to the introduction of water.

The development of approximately 8 lbs per square inch of pressure within tank 10 is indicated by pressure gauge 50. The gauge indicates when sufficient fluidizing water has been introduced to the tank and causes rinse water valve 36, discharge valve 42 and conveying air valve 30 to be opened immediately upon reaching full fluidization. Conveying then begins. Pressure in the tank rises to above 8 lbs per square inch until the tank and discharge line empties. Spray ball 34 washes down tank walls 14 to insure complete removal of particulate material from tank 10. Air supply valve 30 and rinse water valve 36 are then closed. The cycle may then be repeated as desired.

Example 2

Referring to FIG. 2, a slurry conveying system of the invention is shown which operates in the same manner as described in Example 1 although the tank is of a different configuration. Pressure tank 110 includes top 112, vertical side walls 114, and frusto-conical side walls 115. Discharge pipe 140 extends through a centered discharge opening 118 into pressure tank 110. The slurry conveying system of FIG. 2 includes conveying line 120, conveying line valve 122, vent 124, vent valve 126, conveying air supply line 128, conveying air supply valve 130, rinse water line 132, spray ball 134, rinse water valve 136, discharge pipe valve 142, Tee connection 144, fluidization pipe 146, fluidization valve 148, and pressure gauge 150 which are constructed and arranged as described above for the corresponding elements of Example 1.

The extension of discharge pipe 140 into tank 110 is such that no landing is provided as described in Example 1. With the first charging of particulate material into tank 110, the particles fill the tank including the region along side walls near discharge pipe 140 and below the open end 152 of discharge pipe 140. Particulate material within this area (designated as 154 in FIG. 2) tends to remain there, creating a stagnant zone. The top of the particulate material within stagnant zone 154 approximates a horizontal landing extending from the open end 152 of discharge pipe 140. The inside diameter of the discharge pipe 140 should be no greater than about two-thirds of the inside diameter of the tank at the height of the discharge pipe. If the discharge pipe diameter is greater than about ⅔'s of the artificial landing created, plugging due to arching may occur. The discharge pipe inside diameter should be greater than about 1/5th of the inside diameter of the tank at the height of the discharge pipe. A ratio of less than 1/5th tends to create an unnecessarily large artificial landing which tends to prevent complete emptying of the hopper or tank 110 without providing a better configuration to prevent arching.

Example 3

Referring to FIG. 4, a slurry conveying system is shown including a pressure tank 210, a top 212 and side walls 214 which are sufficiently steep and smooth to cause flow of the solid within the tank without stagnant regions. Preferably, side walls 214 are angled at about 70° angle.

The tank bottom includes a landing 216 through which a discharge opening 218 is centered. In this example, the diameter of landing 216 was 12" and the diameter of discharge opening 218 was 3". The tank volume was approximately 13½ standard cubic feet.

Particulate material enters tank 210 through conveying line 220 which is preferably about 12" in diameter and is placed in the center of tank top 212. A valve 222 controls the amount of material that can enter the tank 210 through conveying line 220. The valve 222 is preferably a knife gate valve or any other valve which does not provide an obstruction when opened. A vent 224 is provided in tank 210 which is preferably situated on top 212 or adjacent thereto. Vent 224 is preferably about a ¾" inside diameter pipe and is controlled by vent valve 226.

Rinsing water enters tank 210 through rinse water line 232 to which a spray ball 234 is attached. Spray ball 234 is preferably positioned near the center of the tank top 212 so as to direct its spray over side walls 214. Rinse water may be supplied through a ¾ or 1" diameter line which may be supplied from city water having a pressure of about 30-50 lbs per square inch. For this example, the spray ball should be able to handle a flow of about 40 gallons per minute. Valve 236 regulates the flow from rinse water line 232.

Although conveying air may enter the tank in nearly any position, the preferred form introduces conveying air through an air supply line 228 which extends through the interior of rinse water line 232, such that air is supplied directly to the spray ball 234 or immediately outside spray ball 234 within tank 210. It has been found that the combination of spray water and conveying air simultaneously directed downwardly on top of particulate within tank 210 eliminates flotation problems and ensures discharge of highly buoyant particles. Air supply pressure depends on the height of the tank relative to the point of discharge. A supply pressure of 80 lbs. per square inch is sufficient for most tank heights. With higher tanks, head pressure aids the discharge and reduces the pressure of conveying air required. A valve 230 may be used to regulate the pressure and flow of air through air supply line 228. In this example, air pressure as low as 20 p.s.i. may be sufficient to cause complete discharge.

A discharge pipe 240 extends from discharge opening 218 to a Tee connection 244. Fluidizing water enters Tee 244 through fluidization pipe 246. Fluidization pipe 246 is preferably a 1½" inside diameter line and supplies water under normal city pressure of approximately 30 to 50 lbs per square inch. Flow through fluidization pipe 246 is regulated by fluidization valve 248. It has been found that the distance between discharge opening 218 and Tee 244 should be approximately 2-4 times the diameter of the discharge opening to lessen obstructions in fluidization pipe 246. The spacing between the Tee and discharge opening 218 also insures that water is directed upwardly through discharge pipe 240 in a nearly vertical vector at the discharge opening 218. Discharge pipe 240 includes a valve 242 below Tee 244 which should open fully and is preferably a knife gate valve. Preferably, valve 242 is positioned within two discharge pipe diameters of Tee 244. When valve 242 is placed close to fluidization pipe 246 less particulate material remains in discharge pipe 240 during the fluidization process.

Slurry conveying is most conveniently operated automatically utilizing a controller which directs the opening and closing of the valves in response to pressures read from a pressure sensor 250. A suitable programmable controller 252 is Texas Instrument Model 510 which may be purchased from Texas Instruments, Inc. of Dallas, Texas. All valves in th system may be operated by solenoids (not shown).

In operation, valves 242, 248, 236 and 230 are initially closed. Approximately 500 lbs of dry solids are charged into tank 210 through conveying line 220. Valve 222 is then closed as is vent valve 226. Valve 248 is opened and fluidizing water preconditions the solids within the tank and breaks up any arches which may have formed at discharge opening 218. Tank pressure raises to approximately 10-12 p.s.i. when a total of approximately 250 lbs of water has been added to the tank.

At a preset pressure, in this example 10-12 p.s.i., discharge valve 242, conveying air valve 230 and rinse water valve 236 are opened simultaneously. Tank 210 empties quickly with the pressure within the tank reaching a maximum of 15 lbs per square inch. In the slurry conveying system, water from the spray ball 234 washes down the tank walls 214, insuring complete discharge of particulate from the tank. The pressure then drops off quickly which is sensed by pressure sensor 250, causing the open valves to close.

It is believed that flow in this slurry conveying system induces ratholing which, in wet systems, may be desirable. It is also believed that the slurry walls collapse due to the addition of water from above until the tank completely empties.

The slurry conveying system of the invention provides for rapid, complete delivery of particles using a limited amount of water and conveying air. The tank design allows for a smaller diameter discharge line which reduces the volume of conveying fluid required. Air and spray water are cut off as soon as the tank is emptied which further decreases the volume of conveying fluid used.

Coal may be conveyed with the system without the problems of coal dust which plague dry conveying systems. The excessive use of air and water is avoided which allows faster drying and burning of the conveyed coal.

In considering this invention, it should be remembered that the present disclosure is illustrative only and that the scope of the invention should be determined by the appended claims.

What is claimed is:

1. Apparatus for creating and conveying a slurry of particulate material comprised of a mixture of lumps and fines in which the lumps may have a diameter of approximately three inches, comprising:
   (a) a closed holding tank having a top, bottom and a truncated cone shaped sidewall;
   (b) a vertical discharge conduit connected to the bottom of said tank in fluid communication with the interior thereof and having a diameter exceeding the diameter of the lumps in the particulate material to be conveyed by at least twenty five percent;
   (c) said conduit having a discharge opening adjacent the bottom of said tank and spaced from said tank sidewall and having a vertical longitudinal axis extending centrally through said discharge opening, said tank sidewall being horizontally spaced away from said discharge opening and said tank bottom having a portion thereof which extends horizontally from said tank sidewall to said discharge opening at a right angle to said discharge conduit to form a horizontal arch preventing landing platform means adjacent to said discharge opening, said arch preventing landing platform means supporting particles of the particulate material so that particles located adjacent to said discharge opening have essentially no vertical contact with said tank sidewall whereby arching can be substantially eliminated, the ratio of said landing platform diameter to said discharge opening diameter being within the range of 1½:1 to 5:1;

(d) inlet means connected to said tank for introducing such particulate material into the interior thereof;

(e) fluidization means connected to said discharge conduit and constructed and arranged to introduce pressurized water thereinto below its said discharge opening and to force and direct said water in a confined reverse flow primarily along the said axis of said conduit which extends centrally through its discharge opening at a velocity sufficient to clear said discharge conduit and convert such particulate material therein and which said tank into a slurry;

(f) compressed air injection means connected to the upper portions of said tank and constructed and arranged to inject compressed air into the said upper portions of said tank after such slurry has been so formed therebelow and to propel the same through said discharge conduit; and (g) valve means within said discharge conduit for controlling the outward flow of slurry therethrough and for closing off the same while said fluidization means is forcing water in a reversed flow through said discharge conduit and its said discharge opening.

2. The apparatus of claim 1 wherein said discharge opening an inside diameter equal to about one-fourth of said landing diameter.

3. The apparatus defined in claim 1 and pressurized water means connected to the upper portions of said tank and constructed and arranged to introduce and direct pressurized water against the inner surface of the sidewall of said tank at a level above the upper level of the slurry while the latter is being discharged through said discharge conduit and while compressed air is being introduced into said tank above the upper level of the slurry by said compressed air injection means.

4. The apparatus of claim 3, wherein said air injection means and said pressurized water means operate in conjunction such that the conveying air and spray water are simultaneously directed downwardly on top of said particulate within said tank.

5. The apparatus defined in claim 1 wherein said fluidization means is connected to said discharge conduit between its said discharge opening and said valve means.

* * * * *